QUADRATURE SIGNAL REJECTION FILTER

Filed Jan. 9, 1963

INVENTOR.
WILLIAM L. ADAMS
BY
Walter J. Kreske
ATTORNEY

INVENTOR.
WILLIAM L. ADAMS
BY
Walter J. Kreske
ATTORNEY

United States Patent Office 3,235,810
Patented Feb. 15, 1966

3,235,810
QUADRATURE SIGNAL REJECTION FILTER

William L. Adams, Lafayette, Ind., assignor to General Electronic Laboratories, Inc., Cambridge, Mass., a corporation of Massachusetts Filed Jan. 9, 1963, Ser. No. 250,372
4 Claims. (Cl. 328—166)

This invention relates to filters, and more particularly to filters for the removal of quadrature and high order harmonics from control signals, particularly for use in controlling servo amplifiers using alternating current control.

In general, servo amplifiers operate on the principle of the cancellation of a command signal by a suitable feedback. It has been found that a serious problem in the proper operation of such servos is caused by the existence of noise components in both the command signal and the feedback signal. Thus, at the summation circuit where the command signal and feedback signals are summed so as to cancel the comamnd signal to produce an equilibrium servo condition, the noise components nevertheless remain uncancelled and may cause spurious operation of the servo. The problem of noise arises primarily from the use of such devices as tachometers to provide the feedback signal. A characteristic of tachometers is that the feedback signal may include not only the desired feedback signal but also components of the same frequency but at different phase from that of the command signal, as well as higher order components of the desired feedback signal frequency and noise generated within the system. Therefore, even though the command signal may have been initially free of noise, when combined with the feedback signal, such undesired components are introduced onto the servo control path and will normally pass through the servo system.

These problems are overcome by the present invention of a quadrature rejection filter which also has other desirable features and advantages. Among these other desirable features and advantages are a quadrature filter which is relatively simple in its construction yet rugged and reliable in its operation and relatively inexpensive to manufacture.

A primary object of the present invention is the provision of a filtering device which removes the quadrature component of undesired signals of the same and higher frequencies than the desired signal but of different phase than the desired signal.

And, another object is the provision of a filtering device for moving the quadrature component of undesired signals of the same frequency but different phase than the desired signals and the higher order harmonics of the desired signal.

And, a further object is the provision of an improved alternating current control servo system wherein the command signal channel has removed therefrom quadrature components of undesired signals of the same frequency but different phase from that of the command signal for insuring more accurate operation of the servo system.

And, another object is the provision of a filtering device adaptable for operation with desired signals in an extremely wide range of selected frequencies.

These and other objects, features and advantages are achieved generally by providing in a pair of electric lines for carrying a desired signal, a switching circuit across the signal lines, and a synchronizing device in control relation to the switching circuit for providing a closed circuit in both lines for a predetermined angle in each cycle of the desired signal.

By arranging the synchronizing device to reduce the angle over which the circuit in both lines are closed, the undesired quadrature component is thereby reduced.

By making the switching circuit in the form of a signal input transformer with a pair of zener diodes connected back-to-back and in series as each of the sides of the secondary, a small, rugged, reliable and effective switching arrangement for removing quadrature components of undesired signals of the same frequency but different phase from the desired signal as well as the second harmonic of the desired signal is thereby achieved. The term back-to-back as herein used is meant the series connection of the two diodes or the two cathodes of each pair of zener diodes.

By making the synchonizing device in the form of a resistor chain across the signal lines and a synchronizing transformer with a synchronizing secondary connected from the center tap on the secondary of the signal input transformer and the centerpoint on the resistor chain, and with the primary of the synchronzing transformer coupled to an alternating voltage reference source, accurate and reliable switching control of the zener diodes is thereby achieved.

By interposing a filter structure in the signal lines at the output of the switching circuit, additional undesired frequencies above the frequency of the desired signal are removed.

These and other features, objects and advantages will be better understood from the following description taken in connection with the accompanying drawings of a preferred embodiment of the invention and wherein.

Figure 1:
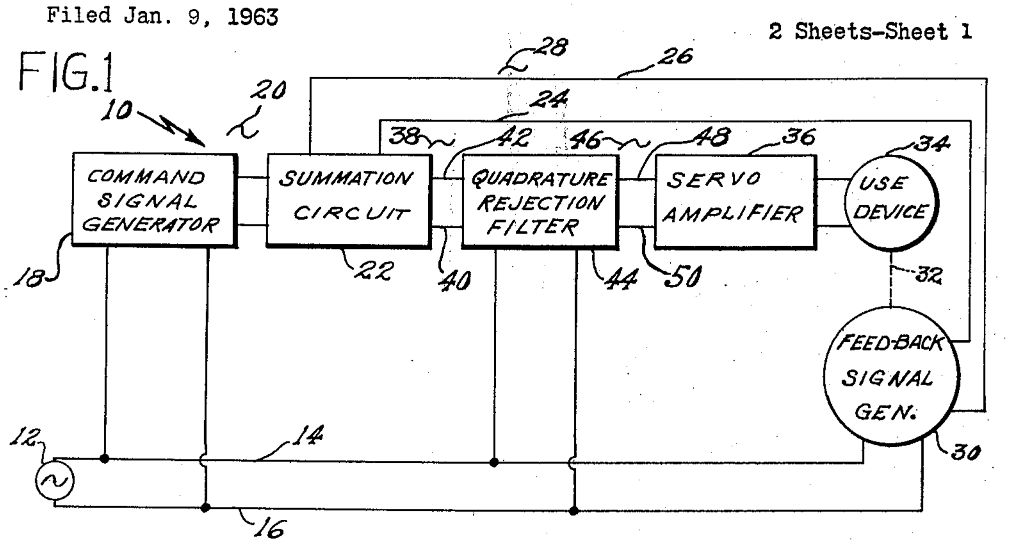
FIG. 1 is a block diagram of an improved servo system incorporating the present invention.

Referring more particularly to servo system incorporating the present invention is designated generally by the numeral 10. The servo system 10 is of the alternating current type and is coupled to a power source 12 which may be a conventional sixty cycle power source feeding power lines 14 and 16 to various components of the servo system 10 as will be herein described.

The servo system 10 has a command signal generator 18 coupled to the lines 14 and 16 and produces an output command signal 20 of the same frequency as the power source 12 and of an intensity determined by the command need. Any suitable command signal generator may be used, as for example, a hand operated rheostat directly operated from the power source 12 for producing the output command signal 20 at the selected frequency and intensity. The command signal 20 is fed to a summation circuit 22 to which is also fed through lines 24 and 26 a feedback signal 28 from a feedback signal generator 30 such as a tachometer, synchro, or other suitable device. The intensity of the signal 28 is determined by the input through a linkage 32 from a use device 34 such as a servo motor which is controlled from or by the output of a servo amplifier 36. One example of a suitable servo amplifier 36 is shown and described in my application Serial No. 86,435, dated February 1, 1961.

The feedback signal generator 30 is coupled through lines 14 and 16 to the power source 12 to produce the feedback signal 28 at the same frequency as the frequency of the power source 12. However, a characteristic of such feedback signals 28 is that they also contain undesired signals of the same frequency but out of phase with the signal 28 and may also include undesired noise. These signals are fed to the summation circuit 22 where the command signal 20 and the feedback signal 28 are summed in a manner to cause a reduced control signal 38 across lines 40 and 42 to the quadrature rejection filter 44 which will be hereinafter further described in connection with FIG. 2.

The object of the summation circuit 22 is to reduce the command signal 20 by the feed back signal 28 to produce thereby a control signal 38 which operates the servo amplifier 36 so as to control the use device 34 in a desired manner. As the use device 34 reaches its desired performance, the feedback signal from the feedback signal amplifier 30 will just balance out the command signal 20 in the summation circuit 22 so as to produce a substantially zero control signal 38 for balanced operation. A problem however occurs when either or both the command signal 20 and the feedback signal 28 include undesired noise components such as signals of the same frequency but different phase than that of the command signal 20 and the feedback signal 28 as well as noise signals of different frequencies. Such undesired noise signals which fail to be cancelled out in the summation circuit 22 prevent a zero control signal 38 output and rather produce a noise signal output which may substantially impair the proper operation or desired control of the use device 34.

It has been found that the greatest cause of such trouble lies in the quadrature component from noise signals of the same frequency as that of the desired control signal but out of phase therewith. It is this quadrature component which the quadrature rejection filter 44, as will be hereinafter further described, successfully reduces to an insignificant value as well as removing noise signals of other undesired frequencies. Thereby, the output from the quadrature rejection filter 44 will be a true control signal 46 in output lines 48 and 50 substantially free of noise to thereby provide an input to the servo amplifier 36 which effectively and efficiently operates the use device 34 in the desired manner.

Figure 2:
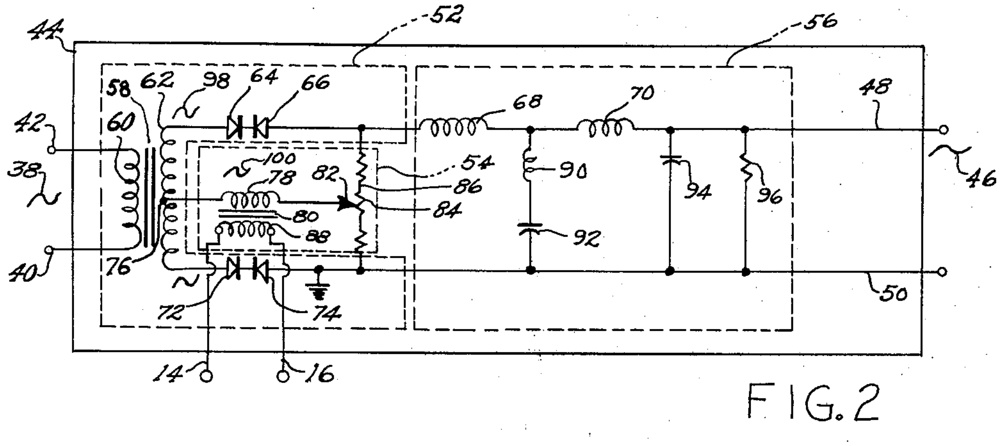
FIG. 2 is a schematic diagram illustrating a preferred arrangement of the quadrature rejection filter shown in FIG. 1.

Referring to FIG. 2 in more detail the quadrature rejection filter 44 is made up of substantially three operable units in combination, namely a switching circuit 52 across the signal lines 48 and 50, a synchronizing circuit 54, and a filter circuit 56.

The switching circuit 52 has a signal input transformer 58 having a primary 60 coupled across the command signal lines 40 and 42, a secondary 62 coupled at one side through back-to-back zener diodes 64 and 66 and choke inductors 68 and 70 to the signal line 48. The other side of the secondary 62 is coupled through back-to-back zener diodes 72 and 74 to grounded line 50. A centertap 76 on the secondary 62 is coupled through a secondary 78 of a synchronizing transformer 80 and a wiper arm 82 to a potentiometer resistor 84 on a resistor voltage divider chain 86 coupled across the output side of the diodes 66 and 74.

The synchronizing transformer 80 has a primary 88 coupled across the power lines 14 and 16.

The filter circuit 56 includes a series inductor 90 and capacitor 92 connected from a point between the inductors 68 and 70 to line 50. It also includes a capacitor 94 and resistor 96 coupled in parallel across the lines 48 and 50 to form a low pass filter. While the present low pass filter circuit 56 specifically described herein is suitable, any low pass filter covering the desired signal range may be used. It should also be understood here, that in some instances it may be desirable to precede the low pass filter 56 with a high pass filter (not shown) to remove frequencies below the frequency of the desired signal 46.

Figure 3:
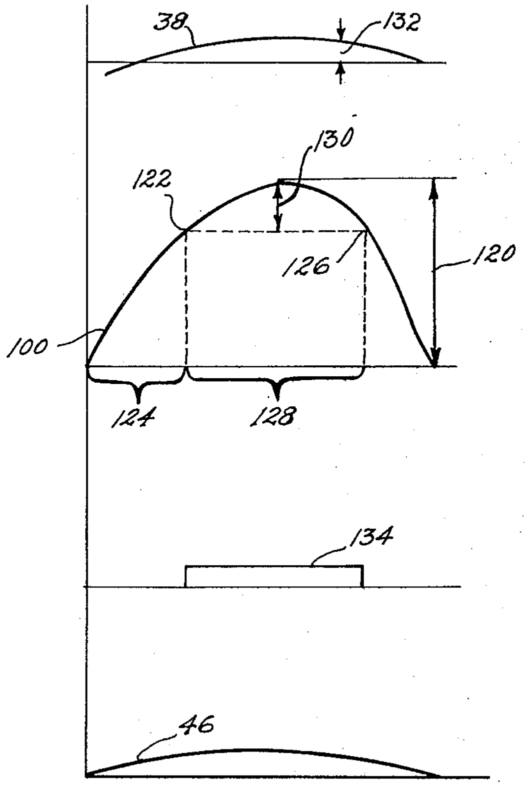
FIG. 3 is a voltage vs. time graph for more clearly illustrating operation of the present invention.

In the operation of the quadrature rejection filter 44, the control signal 38 from the summation circuit 22 carrying noise and undesired signal components, as explained above, is fed by the primary 60 across the secondary 62 so as to appear at the zener diodes 64 and 66 as a control signal 98. Simultaneously a phase reference signal from the power source 12 appears through the primary 88 of the synchronizing transformer 80 at the synchronizing transformer secondary 78 as a synchronizing signal 100 (FIG. 3). The synchronizing signal 100 being from the same source 12 as that from which the command signal 20 and feedback signal 28 are derived, will be at the same desired frequency and phase. In the event of any phase difference, conventional corrective phase shifting components (not shown) may be used. The intensity 120 of the synchronizing signal 100 (FIG. 3) is set such that from a point 122 which is at an angle 124 of about sixty degrees from the beginning of the synchronizing signal cycle, sufficient voltage will be developed across the zener diodes 64 and 66 and zener diodes 72 and 74 in the absence of control signal 98 to close the circuit to signal lines 48 and 50, which circuit will again be opened at point 126 in the cycle after a closing angle 128 of approximately sixty degrees.

During this period 128 of closed circuit operation, the intensity 130 or voltage difference between the points 122 and peak 120 of the synchronizing signal 100 is made large with respect to the intensity 132 of the control signal 38 (FIG. 3) and small with respect to the intensity 120 of the synchronizing signal 100.

If a signal 38 appears across lines 40 and 42 at the time the zener diodes 64, 66, and 72, 76 are closed, that portion of the signal 38 appearing during the sixty degree angle 128 will appear across the resistor voltage divider chain 86 as the signal 134 (FIG. 3). The signal 134, upon passing through the filter 56, where the undesired noise is removed, appears across the control signal lines 48 and 50 as the desired control signal 46 now having a desirable phase relation with the power source 12 arranged by the configuration of the quadrature rejection filter 44 for best circuit performance.

Figure 4:
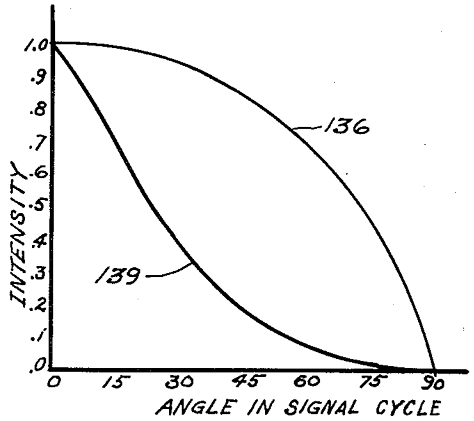
FIG. 4 is a voltage vs. angle graph for more clearly illustrating operation of the present invention.

An angle 128 of sixty degrees has been found in the present instance to be most effective for the operation of the device described. In general, however, the angle 128 which is selected for operation will depend on the degree of noise in the feedback and command signals 20 and 28 respectively and thereby noise in the control signal 38 as well as signal level desired for operation of the servo amplifier 36. The angle 128 most suitable for a particular purpose may be found from FIG. 4 wherein the curve 136 shows the diminution of desired output intensity of desired output signal 46 as a function of the size of angle 128 and the dotted curve 139 shows the degree of transmission of the quadrature component.

Figure 5:
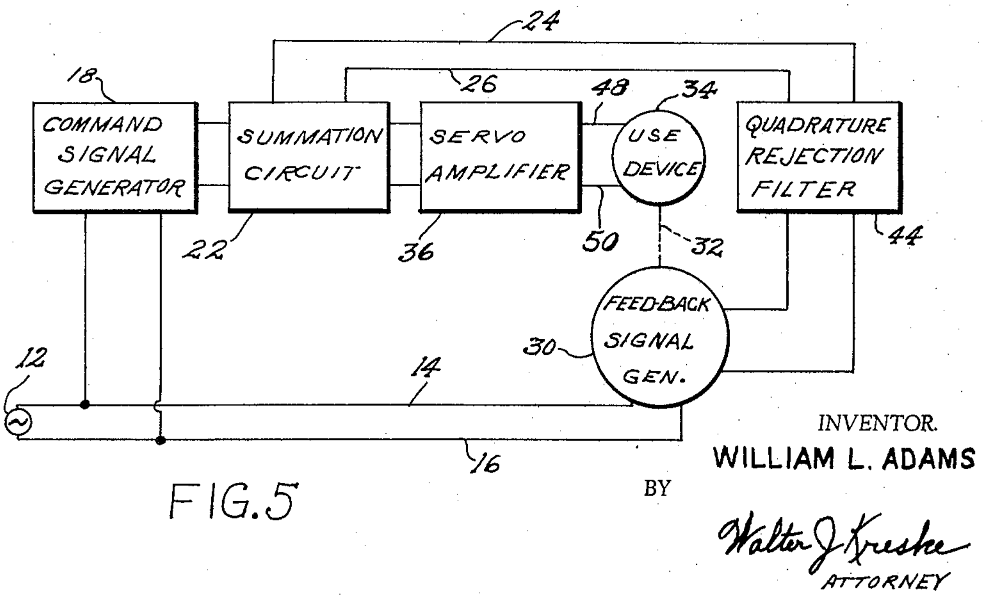
FIG. 5 is a schematic diagram illustrating an alternative embodiment of the invention.

Referring to FIG. 5 in more detail, the alternative embodiment illustrated therein is constructed with the quadrature rejection filter 44 at the output of the feedback signal generator 30 so as to remove undesired quadrature component signals emanating from the feedback signal generator 30 which is usually the major source of undesired quadrature component signals. Thus, the feedback signal through lines 24 and 26 to the summation circuit 22 will carry a substantially pure inphase feedpack signal. The signals from the summation circuit 22 may thereby be fed directly to the servo amplifier 36 through lines 40 and 42 without the need for a quadrature filter in lines 40 and 42. The remaining components and operation may be similar to that shown and described in connection with FIG. 1.

This invention is not limited to the particular details of construction and operation shown as equivalents will suggest themselves to those skilled in the art.

What is claimed is:

1. In combination, a pair of electrically conductive lines for carrying a signal at a selected frequency, a transformer primary across said lines, a transformer secondary inductively coupled to the primary and having two ends and a center tap, a pair of electrically conductive output lines, a diode type current valve means for each of the output lines, each of said current valve means having capacity for passing current in the direction of a selected voltage drop across said current valve means, each current valve means coupled to a respective secondary end and output line, a resistor means across the output lines, and a synchronizing transformer having a primary and a secondary, with the synchronizing transformer secondary having two ends, one of said synchronizing transformer secondary ends connected to said center tap, the other of said synchronizing transformer secondary ends connected to said resistor means, and the synchronizing transformer primary adapted for coupling to an electric power source having the same frequency as said selected frequency.

2. In combination, a pair of electrically conductive lines for carrying a signal at a selected frequency, a transformer primary across said lines, a transformer secondary inductively coupled to the primary and having two ends and a center tap, a pair of electrically conductive output lines, a pair of back-to-back zener diodes in each of the output lines, each back-to-back zener diode pair coupled to a respective secondary end and output lines, a resistor means across the output lines, and a synchronizing transformer having a primary and a secondary, with the synchronizing transformer secondary coupled to said center tap and resistor means and the synchronizing transformer primary adapted for coupling to an electric power source having the same frequency as said selected frequency.

3. In combination, a pair of electrically conductive lines for carrying a signal at a selected frequency, a transformer primary across said lines, a transformer secondary inductively coupled to said primary and having two ends, a pair of electrically conductive output lines, a zener diode current valve means for each of the output lines, said zener diode current valve means having capacity for conducting current in the direction of a preselected voltage drop across said zener diode current valve means, each zener diode current valve means coupled to a respective secondary end and output line, a resistor chain having two ends with one end of the resistor chain connected to one output line and the other end of the resistor chain connected to the other output line, synchronizing circuit means coupled across each of said zener diode current valve means and in responsive relation to said selected frequency signal for effecting said voltage drop to pass a predetermined portion of each cycle of said selected frequency signal.

4. The combination as in claim 2 having additionally a low pass filter circuit coupled in said output lines.

References Cited by the Examiner

UNITED STATES PATENTS

| | | | |
|---|---|---|---|
| 2,873,364 | 2/1959 | Huddleston et al. | |
| 2,881,379 | 4/1959 | Logan | 318—328 |
| 2,900,506 | 8/1959 | Whetter | 307—88.5 |
| 2,982,867 | 5/1961 | Wennerberg | 328—166 X |
| 3,008,076 | 11/1961 | MacDonald | 318—448 |
| 3,085,166 | 4/1963 | Gogia et al. | 328—166 |

DAVID J. GALVIN, *Primary Examiner.*

JOHN F. COUCH, JOHN W. HUCKERT, *Examiners.*